Figure 1:
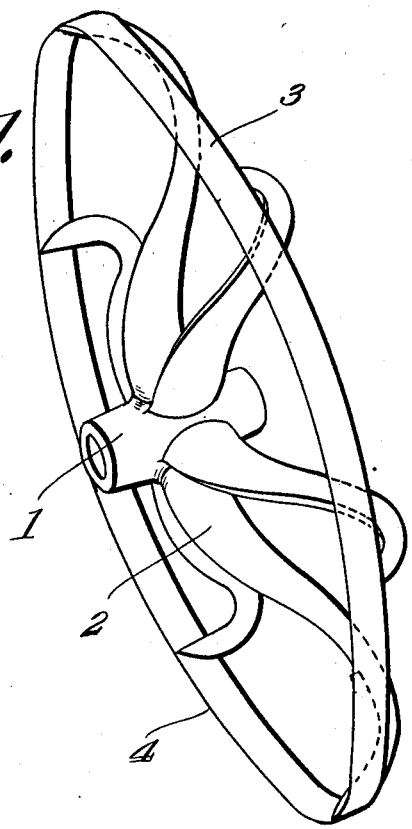

H. PETERSEN.
CULTIVATOR WHEEL.
APPLICATION FILED SEPT. 21, 1910.

1,004,191.

Patented Sept. 26, 1911.

Henry Petersen Inventor,
by C. A. Snow & Co.
Attorneys.

Witnesses

COLUMBIA PLANOGRAPH CO., WASHINGTON, D. C.

UNITED STATES PATENT OFFICE.

HENRY PETERSEN, OF MOUNT AUBURN, IOWA.

CULTIVATOR-WHEEL.

1,004,191.  Specification of Letters Patent.  Patented Sept. 26, 1911.

Application filed September 21, 1910.  Serial No. 583,056.

*To all whom it may concern:*

Be it known that I, HENRY PETERSEN, a citizen of the United States, residing at Mount Auburn, in the county of Benton and State of Iowa, have invented a new and useful Cultivator-Wheel, of which the following is a specification.

This invention has relation to skeleton members adapted to be used upon agricultural machines such for instance as cultivators and harrows and consists in the novel construction and arrangement of its parts as hereinafter shown, described and claimed.

The object of the invention is to provide a member of the class indicated which is of peculiar construction its parts being so arranged that when the member is mounted and presented to the soil and is pitched at a desired angle it will operate upon the soil in an advantageous manner and at the same time sufficient clearance is afforded to prevent the member picking up vegetation or becoming balled or clogged with the same.

With this object in view the member includes a hub to which is attached the inner ends of a series of compound curved spokes and having a narrow share or hoop located and attached to the outer ends of the said spokes, the said share is provided with a forward cutting edge and is disposed with its longer transverse dimension approximately parallel to the axis of the hub and may be of any one of several preferred forms in transverse section. With respect to a plane which passes through the said share and hub, the said spokes pass transversely across the said plane in their extent from the hub to the share. By this arrangement of the parts of the member the said member may be pitched at an angle to the line of draft of the machine to which it is applied and the axis of the hub may be at an angle to a horizontal and when the member is so positioned there is sufficient clearance afforded in the line of draft of the machine to which the member is applied to permit the lower portion of the share to engage the soil and at the same time the space between the spokes is sufficient to permit the plants or vegetable growth to pass between the spokes as the soil is turned without the said plants becoming caught between the spokes and clogging up the member. When the member is used upon ground on which tangled vines such for instance as morning glories are growing, the vines in the main are engaged and lifted from the ground and dumped to one side without passing through the member. The carrying, hanging and adjusting devices for this member may be readily made by any mechanic familiar with the art to which agricultural machines adapted to use this member belong.

Figure 2:
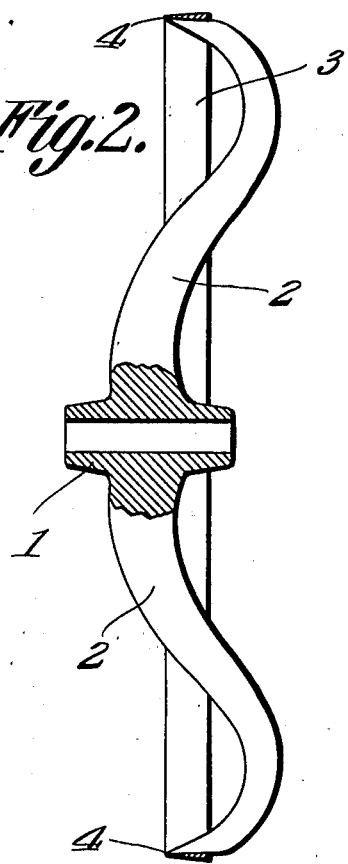

In the accompanying drawings:—Figure 1 is a front view of the member in operating position viewing the same in the line of draft. Fig. 2 is a sectional view of the member. Figs. 3 to 10 inclusive, of views of modified forms of shares that may be used upon the member.

Figure 3:
Figure 6:
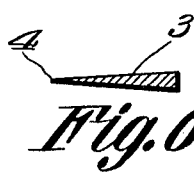
Figure 9:
Figure 4:
Figure 7:
Figure 10:
Figure 5:
Figure 8:

As illustrated in the accompanying drawings the member consists of a central hub 1 to which is integrally or otherwise attached the inner end of a spoke or spokes 2. The spokes 2 are radially disposed with relation to the member but in side elevation described are compound curved. A narrow annular thin share or hoop 3 is integrally or otherwise joined with the outer ends of the spokes 2 and lies in a plane which is traversed once by said spokes in their extent from the hub to the said share. The said share 3 is in the form of a relatively thin band or ring with its longer transverse dimension approximately parallel with the axis of the hub 1. The share 3 is provided with a forward cutting edge 4 and as illustrated in Fig. 2 of the drawings said share may be approximately triangular in cross section. The share however may be of any other configuration in cross section and in Fig. 3 is illustrated a share which is approximately elliptical in cross section. In Fig. 4 a share which is approximately diamond shaped in cross section is illustrated and in Fig. 5 a share which in cross section is a combination between semi-elliptical and semi-diamond shaped is illustrated.

As hereinbefore stated the skeleton soil engaging member may be applied to an agricultural machine such for instance as a harrow or a cultivator and when in operating position it is pitched at an angle to the line of draft of the machine upon which it is mounted and the axis of the hub 1 is pitched at an angle to the horizontal. The specific degree of pitch in the various directions is immaterial but when the member is so positioned it assumes a position approximately as illustrated in Fig. 1 of the drawing which is the front elevation of the said member in this position. By reference to this figure of the drawing it will be seen that in a direction of the line of draft of the machine to which the member is applied that there is ample clearance in a direction of the line of draft to leave between the spokes at the lower portion of the member to permit the plants and other objects to pass freely through the member as the machine travels in the line of draft without packing or clogging against the spokes of the share of the member. As the member is moved along the ground while in the position indicated the said member rotates and the share encounters the soil and cuts below the surface of the same agitating the soil and casting the same to one side to a greater or less extent according to the angularity of the pitch of the member. By reason of the fact that the long dimension of the share 3 in transverse section is approximately parallel with the axis of the hub 1 there are no upwardly disposed parts of the member which would tend to unnecessarily cast or spade the soil and as the said share rotates upon and over the soil it will readily free itself and prevent the accumulation of material as indicated. Inasmuch as the means for adjusting the angular position of the member forms no part of the present invention and are common in agricultural machines a mere allusion to the same is sufficient in this specification.

This invention is not a soil working disk or the rim of a disk mounted upon a hub and spokes as portions of disks, so mounted and perforated disks have been used before, but it is a soil working member in the general form of a wheel, having a relatively narrow annular share which corresponds to the rim of the wheel above referred to. This member, when in operating position, is pitched approximately at the angles indicated to effectually engage and work the soil without gathering vegetable growth.

Having described the invention what I claim as new and desire to secure by Letters Patent is:—

A wheel adapted for the severance of soil-infesting vines, with a minimum soil-disturbance, the wheel comprising a hub, a rim having its longer transverse dimension parallel to the axis of the hub, and spokes connecting the rim and the hub; the rim having a forward cutting edge, the spokes being reversely curved to dispose the center of the hub in front of the cutting edge, and the hub having its ends disposed upon opposite sides of the rim.

In testimony that I claim the foregoing as my own, I have hereto affixed my signature in the presence of two witnesses.

HENRY PETERSEN.

Witnesses:
F. B. OCHSENREITER,
HERBERT D. LAWSON.

---

Copies of this patent may be obtained for five cents each, by addressing the "Commissioner of Patents, Washington, D. C."